Jan. 24, 1961 W. A. SHURCLIFF 2,968,994
AUTOMATIC FOCUSING DEVICES AND SYSTEMS
Filed April 23, 1956 4 Sheets-Sheet 2

INVENTOR
William A. Shurcliff
BY Brown and Mikulka
ATTORNEYS

United States Patent Office 2,968,994
Patented Jan. 24, 1961

2,968,994
AUTOMATIC FOCUSING DEVICES AND SYSTEMS

William A. Shurcliff, Cambridge, Mass., assignor to Polaroid Corporation, Cambridge, Mass., a corporation of Delaware Filed Apr. 23, 1956, Ser. No. 579,976

21 Claims. (Cl. 88—39)

This invention relates to systems and devices which automatically establish and maintain correct focus of optical systems with which they are associated or incorporated, and more particularly to such systems and devices when incorporated with a microscope.

In employing an optical system to obtain desired imaging of an object or specimen, the usual practice involves manually adjusting the focus of the system, by a trial and error method. Where the optical system is that of a microscope, and where the microscope is of high power, inspection of an object may require frequent readjustments of focus, perhaps as often as several hundred times an hour, the eye being used to judge the sharpness of focus and the hand to establish or correct the focus, a fatiguing and time-consuming procedure at best. Among normally-encountered operations or conditions which necessitate alteration of focus are, for example, "tracking" a specimen when the slide is being moved laterally, changes in thickness and flatness of the slide, changes in thickness and index of the cover glass, changes in index of the immersion fluid, and temperature change effects.

Under conditions which call for the greatest possible accuracy of focus, the problem may be more acute than that of merely experiencing inconvenience or fatigue and may even involve complete inability to obtain satisfactory focus by conventional methods. Where a microscope system employs photographic detectors, photoelectric detectors or other similar devices which lack the accommodating features of the human eye, extreme focusing precision is necessary. A precise, automatic focusing system would offer special advantages where light beyond the visible spectral range is employed, namely, in ultraviolet and infrared microscopy in which photographic, photoelectric or some other type of radiation detector is used. Again, such a system would present distinct advantages where changes in the thickness or index of the specimen occur at too great a speed for adjustment of focus by manual adjusting means.

From the foregoing, it will be apparent that a system which continuously, precisely and automatically insures proper focusing with respect to an object positioned in the vicinity of the first focal point of an objective and undergoing observation or inspection, under a wide variety of conditions, would serve many important functions, particularly in the field of microscopy. It is with a system having this automatic or self-focusing feature, together with other related advantages, to be described below, that the present invention is concerned.

Accordingly, an object of the invention is to provide a system capable of automatically "appraising" and correcting the focus of an optical system with which the system is incorporated.

Another object of the invention is to provide a system having automatic focus-adjusting features suitable for incorporation with a high power microscope.

A further object of the invention is to provide a device for appraising and automatically correcting the focus of an optical system with which the device is associated.

Other objects of the invention are to provide a self-focusing optical system by means of the cooperation of optical and photoelectric components with a servomechanism; to provide an automatic focusing system which is characterized by extreme focusing precision and which is operative in conjunction with photographic or photoelectric detectors; to provide a system of the character described which functions in the invisible spectral wavelength bands such as the ultraviolet and infrared; and to provide a self-focusing system which adjusts initially to a specimen plane, which is capable of rapid response to differences in the specimen and which is adapted to continuous operation over long periods, without drift.

Further objects of the invention are to provide a system comprising a combination of optical and photoelectric elements with a follow-up or feedback circuit for the purpose of exploring surface topography of microscopically "stepped" surfaces and for evaluating longitudinal chromatic aberration in high quality objectives.

Other objects of the invention will in part be apparent from the following description, taken in conjunction with the accompanying drawings, wherein like reference characters refer to like parts throughout the several views of which:

Figure 1:
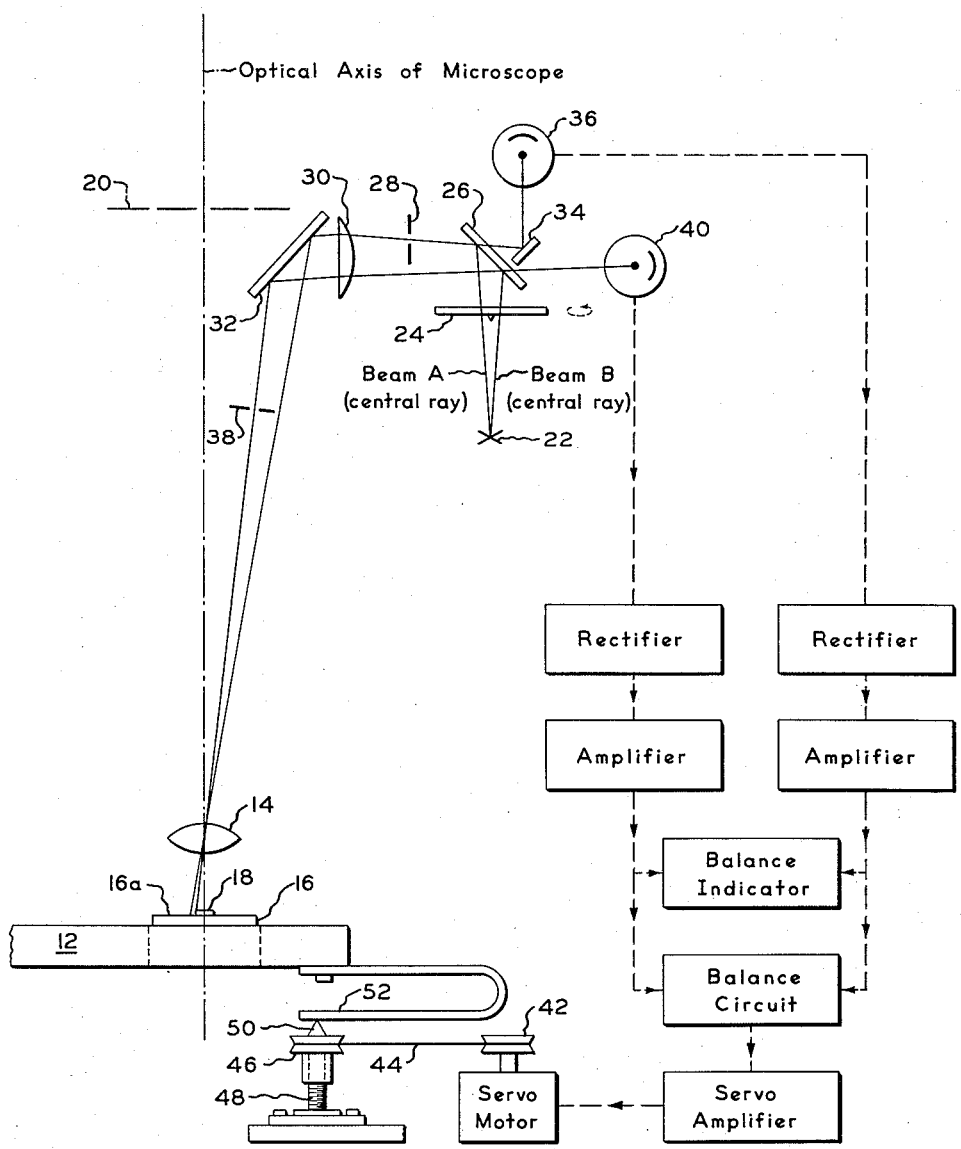
Figure 1 is a diagrammatic view of an automatic focusing system forming one embodiment of the invention.

Fig. 1 illustrates a preferred type of system of the invention which is adapted to appraise, correct and maintain the focus of a high-power microscope, precisely, rapidly and automatically. The only components of the microscope shown are stage 12 and objective 14. Other conventional elements of the microscope are understood to exist but have been omitted since their inclusion is not necessary to an understanding of the system.

The system may be considered as consisting of two major subsystems or sections, namely, a focus appraisal section and a focus correction section. The focus appraisal section includes objective 14, slide 16 preferably having a semi-reflecting upper surface 16a and additional elements, principally optical, to be described below, which are employed to determine the sign and magnitude of the focus error, if any. A specimen 18, at least a part of which should be assumed to be of a transparent type, is shown mounted on slide 16. The automatic focusing operation can, however, be performed without a specimen mounted on the slide by using the upper surface 16a of slide 16 as a reflecting means. Basic focusing operations, therefore, will be considered without regard to the presence or absence of a specimen on slide surface 16a. The broken line 20 indicates the location of the focal plane with respect to the plane of reflecting surface 16a when said planes are conjugate. The focal plane at 20 may, for example, be considered as lying within the principal focus of an eyepiece or ocular, not shown, or it could be the plane of a photographic film or other plane employed for imaging purposes. The focus appraisal section operates by repeatedly evaluating the conjugacy of the focal plane and the plane of slide surface 16a, said conjugacy being determined by proper relative spacing of the objective and the surface 16a. The focus correction section comprises the electronic and mechanical components, shown by block diagram, with wiring being indicated by broken line, and by the mechanical connection to stage 12, which operate together to re-establish the focus so as to reduce the error to zero. Both sections operate on null principles and thus are essentially independent of fluctuations of line voltage. A light source producing light of a wavelength which will not conflict with other illumination means of a microscope, or, for example, of a wavelength to which photosensitive film positioned at the focal plane is not sensitive, can be employed.

The focus appraisal section does not use the conventional illumination system of the microscope. Rather, it employs an individual light source 22 as, for example, a small tungsten lamp which produces two functional focusing beams which will be termed beam A and beam B, respectively. Beam A passes through openings of a rotating chopper or shutter 24 which provides a pulsating beam having a frequency which is suitable for amplification and differentiation purposes when converted to alternating current as, for example, a frequency of 1440 c.p.s. Chopper 24 may appropriately be in the form of a disk having a circular array of small holes which are successively positioned in the path of beam A. The disk is rotated at a given speed to provide the wanted frequency. From chopper 24, the beam passes to beam splitter 26. The component of beam A which is reflected by beam splitter 26 passes, respectively, through a diaphragm 28 having an aperture of given dimensions and through a converging lens 30. From lens 30, beam A is reflected by a plane mirror 32 so as to pass through objective 14 and impinge upon the upper surface 16a of slide 16, said surface 16a having a given reflectivity. From surface 16a, a component of beam A is reflected back through objective 14, to mirror 32, through lens 30 and, by an amount dependent upon the optical path length from objective 14 to surface 16a, through the aperture of diaphragm 28. Thence a component of beam A passes through beam splitter 26 to plane mirror 34 and is incident on a given area of the photocathode of phototube 36. Phototube 36 may appropriately be a multiplier phototube, such as a multiplier phototube 931–A, manufactured by Radio Corporation of America.

Beam B passes through the openings of chopper 24 where it is converted to a pulsating beam preferably in a manner such that its pulsations have a frequency similar to those of beam A and may or may not be in phase with the pulsations of beam A. Pulsating beam B passes from chopper 24 to beam splitter 26. Thence, a reflected component passes through lens 30, is reflected by plane mirror 32, passes through the predeterminedly formed aperture of diaphragm 38, through objective 14, and impinges upon reflecting surface 16a. From surface 16a the reflected component of beam B returns through objective 14 and through the aperture of diaphragm 38 to an extent which is permitted by the correctness of focus. Thence the returning beam B component is reflected by plane mirror 32, passes through lens 30, and through beam splitter 26 to the photocathode of phototube 40, which is preferably similar in type to phototube 36.

Lens 30 provides a predeterminedly magnified image of the light source at the entrance pupil of objective 14 and images objective 14 at the photocathodes of phototubes 36 and 40. Lens 30 is preferably tilted slightly to prevent unwanted reflections from its surface being transmitted to the phototubes. The beams or rays which are transmitted toward slide surface 16a may appropriately be termed first-pass beams or rays and those which are reflected and which return through objective 14 second-pass beams or rays.

Figure 2:
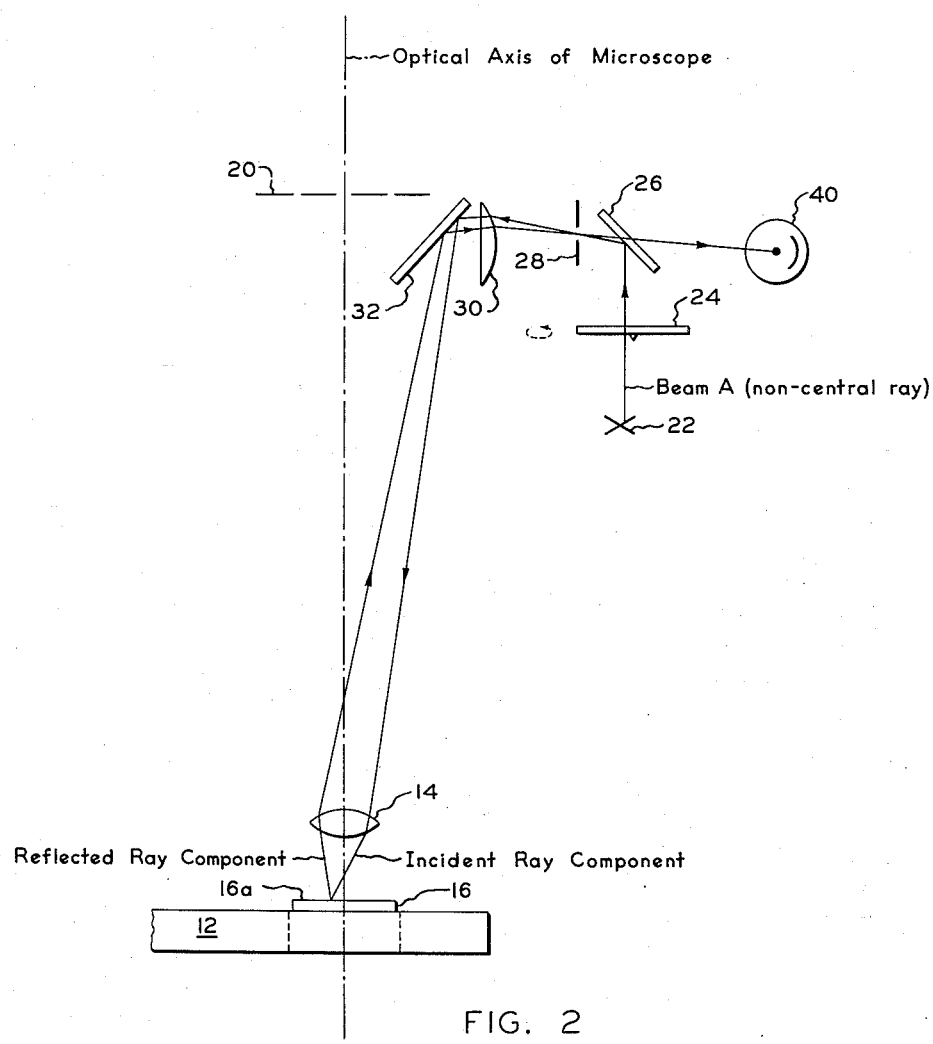
Fig. 2 is a diagrammatic view illustrating the path of a light ray employed in the system.

For purposes of explanation and to avoid the confusion of presenting a multiplicity of rays forming beams A and B in Fig. 1, the paths of rays of beams A and B returning from reflecting surface 16a are shown as similar to those leading toward said surface. This illustrates the approximate path of the central ray of each beam. Actually the paths of the rays of a given beam toward and away from surface 16a are not identical. A non-central ray is illustrated in Fig. 2 which shows, in detail, the incident and reflected components. This ray may, for example, be considered a non-central ray of beam A of Fig. 1. The important fact relative to operation is that all of the rays that pass through the objective and are then reflected return through the objective.

The conjugacy of the reflecting surface 16a and the focal plane at 20 is automatically determined using a given objective 14 and, as may be necessary, a given cover glass and a given layer of immersion fluid. A cover glass and layer of immersion fluid are not shown because they are not indispensable to basic operation of the system. The conjugacy determined is that of the plane of surface 16a and the focal plane at 20 and said conjugacy assumes that the focus is such as to provide a transmitted component of beam A and a transmitted component of beam B which are of relatively equal intensity when incident upon their respective phototubes. The determination of conjugacy can be carried out irrespective of the size or shape of the specimen and regardless of whether a specimen is present, assuming surface 16a to have adequate reflectivity.

Only those portions of the beams A and B which are incident on reflecting surface 16a and which are reflected back through objective 14 serve a function in the system. Parts of the beams are transmitted by slide 16 and serve no useful purpose. Depending upon the focus setting, namely, the spacing of objective 14 relative to surface 16a, the reflected or second-pass components of beams A and B will be more or less concentrated within the apertures of diaphragms 28 and 38, respectively. If the focus is correct, namely, if it is such that both diaphragm openings are imaged with substantially equal transmission efficiency on reflecting surface 16a, each reflected beam component will return through its respective diaphragm opening in substantially equally concentrated form and the reflected components of beams A and B will thus be of equal strength when they are incident on the photocathodes of phototubes 36 and 40, respectively. If the focus is incorrect so that the diaphragm openings are differentially imaged with respect to reflecting surface 16a, one of the reflected beam components will more completely pass through its diaphragm opening than will the other or, otherwise stated, it will be transmitted as a component of greater intensity. If the latter condition is the case, the A and B components will have relatively different intensities when they are incident on their respective phototubes. The adjustment of focus is extremely sensitive. If the spacing of objective 14 and surface 16a is changed only slightly, for example only 1 micron, and if the image of a diaphragm aperture is spaced but a small distance from surface 16a, the ensuing image will be spaced, longitudinally of the beam, a relatively great distance with the diaphragm aperture and a relatively small quantity of light will pass through the diaphragm aperture. Diaphragms 28 and 38 are preferably positioned in the system so that the effective distance of diaphragm 28 from objective 14 is greater than the distance of image plane 20 from the objective and the effective distance of diaphragm 38 from objective 14 is less than that of image plane 20 from the objective. The diaphragm apertures may thus be said to bracket the image plane.

The beams A and B arriving at phototubes 36 and 40, respectively, as pulse trains of given frequency cause phototubes 36 and 40 to produce an A.C. output which is amplified, rectified and compared by suitable amplifying, rectifying and balancing electronic components of the focus correcting section, shown in block form in Fig. 1. When the signal from one of the phototubes is the stronger, it indicates an error in the optical path length between objective 14 and surface 16a in a given direction and a D.C. signal is supplied to the drive or servo motor so as to cause rotation of the latter in a given direction. When the signal from the other phototube is the stronger, it indicates a focus error in an opposite direction and a D.C. signal of opposite direction is supplied to the servo motor so as to cause rotation of the latter in an opposite direction. When the signals in both branches balance one another, focus is correct and no rotation of the servo motor occurs. A null or balance indicator, such as a zero-center galvanometer, designates the direction and magnitude of the focus error. The servo motor is coupled to the microscope so as to provide minute correctional adjustments in the spacing of objective 14 with respect to surface 16a. The coupling mechanism shown comprises servo motor pulley 42 which is connected by belt 44 to pulley assembly 46. The latter is internally threaded to fixed screw element 48. Depending upon the direction in which pulley 46 is caused to rotate, a projection 50 of pulley 46 is moved longitudinally so as to bear against and to provide stressing of U-shaped spring member 52 to a varying degree. Accordingly, stage 12, to which an opposite end of spring 52 is attached, is bent toward or away from objective 14 and the spacing between objective 14 and reflecting surface 16a is thus varied.

It will be understood that by employing two beams in the manner described a "balance" type of system is achieved. Each beam calls for a slightly different ideal focus. Extreme precision is thus possible and stability of focus is maintained. In operation of the system, for example if the distance of semi-reflecting surface 16a from objective 14 is a few microns too great, the returning component of beam B is caused to be brighter than that of beam A; if surface 16a is one or more microns too close to the objective, the returning component of beam A is caused to be the brighter.

Inasmuch as an actual specimen plane, namely, the median plane through the center of gravity of specimen 18, is not identical to the upper surface 16a of the slide, a slight correction must be made in the focusing operation. Typical specimens may have a median plane 1 or 2 microns above the upper surface 16a of the slide. To allow for this fact, components of the system may be adjusted or "biased" so that when the balance indicator registers zero, the desired focal plane 20 will be exactly conjugate to the median plane of the specimen. Biasing can be accomplished by several methods. One method would be to vary the path distance of one, or both, of the diaphragms 28 and 38 with respect to objective 14, as, for example, by moving one or both diaphragms one or two centimeters nearer to the objective. Or, one of the diaphragm apertures can be varied in size relative to the other. A further method would be to vary the signal gain in one branch of the focus correcting section by adjusting or modifying an amplifier unit.

To insure operation of the system, at least a small fraction of each focusing beam must be reflected from a surface closely adjacent to the median plane of the specimen. The upper surface 16a of the slide is well suited to this purpose and surface 16a may, appropriately, be aluminized to provide a semi-reflecting coating for enhancing its reflectivity. If surface 16a is uncoated and if it carries an immersion fluid having an index so similar to that of the glass that essentially no reflection results, either an immersion fluid or a glass having a difference of index preferably exceeding 0.1 unit of refractive index may be substituted for that previously used. If the specimen as a whole is so lacking in transparency as to obstruct the approaching focusing beams before they reach the upper surface 16a of the slide, a reflecting surface located between the specimen and the objective will be required. Such a reflecting surface could be provided by the lower surface of the cover glass. Reflections from the upper surface of a cover glass or from the lower surface of the slide are so far removed from the median plane of the specimen as to have no significant effect relative to the automatic focusing system.

When, during the focusing operation, the relative movement of surface 16a and objective 14 establishes a condition of best focus, the phototube output currents are equal. If the diaphragm apertures are small and if the magnification of the objective is large, the condition is extremely sharp. This sharpness results, at least in part, from what may be termed an error-doubling principle. For example, if objective 14 and surface 16a are 1 micron too close together, a first, virtual image is 1 micron below surface 16a and a real image is 1 micron above surface 16a or 2 microns too close to the objective. It may thus be said that the first-pass ray establishes the error and reflection from the slide surface amplifies it by a factor of two. However, the great precision of the system appears to depend more particularly on the balance feature, hereinbefore described.

The size of the apertures in diaphragms 28 and 38 may be varied considerably. Reducing the size of an aperture tends to produce a sharper peak in a curve relating output of the phototubes and spacing of surface 16a and objective 14 and, therefore, may be considered as providing greater precision. A larger diaphragm opening allows more light to pass and reduces the relative importance of extraneous effects such as stray light, shot effect, etc. and, therefore, may be preferred under certain conditions.

Relative spacing of diaphragms 28 and 38 in the system may also be varied appreciably. If, for example, the separation, measured lengthwise of the beam, is of the order of 10 centimeters and if the magnification is 100 times, the position of surface 16a, within its range of movement, which maximizes the signal identified with beam A is approximately $10 \text{ cm.}/(100)^2$ or $10\mu$ from the position which maximizes the signal identified with beam B. This provides a very useful focusing range. If the aperture separation were varied by a factor of five, the range of movement of surface 16a would be changed fivefold also, which would still constitute a useful range. If diaphragm apertures are large, wide separation of the diaphragms is particularly appropriate. Where wide separation requires using too much space from a design aspect, the magnitude of the separation can be increased virtually as, for example, by placing diaphragms 28 and 38 at opposite sides of lens 30, as shown in Fig. 1.

Figure 3:
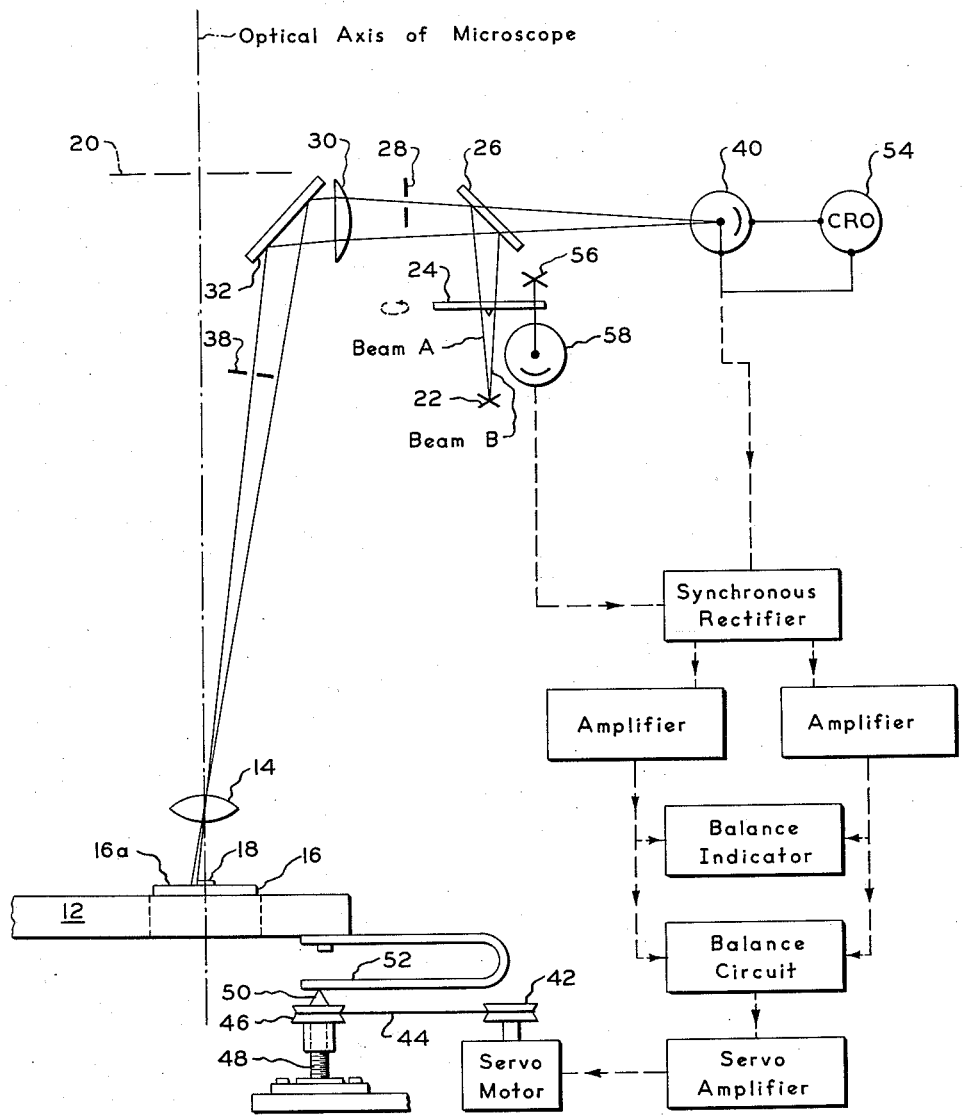
Fig. 3 is a diagrammatic view of a modification of the system of Fig. 1.

In Fig. 3 a modification of the system of Fig. 1 is shown which employs but one photomultiplier and which, accordingly, comprises a somewhat modified focus correction section. The focus appraisal section of the system is similar to that of Fig. 1 excepting that plane mirror 34 and phototube 36 have been deleted and the chopping operation of beams A and B has been altered so that the pulse trains are not in phase and are cleanly separated in time dimension. This permits the use of a single phototube for comparison of the two beams. The mechanical coupling of the servo motor with stage 12 is the same as that shown in Fig. 1.

When focus is correct, components of beams A and B, of equal intensity, having the same frequency but predeterminedly out-of-phase, are successively incident upon the same spot of the photocathode of phototube 40. The output of phototube 40 would then be visible in the form of two pips of equal height on the screen of cathode ray oscilloscope 54. Inequality of pip heights would indicate an out-of-focus condition in a given direction and of a given magnitude. The A.C. output or signal identified with each beam is synchronously rectified; one of the signals is subtracted from the other and, where a difference exists because of a focus error, the difference, in the form of a D.C. error signal, is amplified and drives the servo motor in either a clockwise or counterclockwise direction depending upon the sign of the error. When focus is correct the two signals balance one another and the servo motor remains stationary. A second light source 56 and a photocell 58 are employed in conjunction with chopper 24 to provide pulses which insure correct relative identity of light beams with a given direction of D.C. supply to the servo motor.

Figure 4:
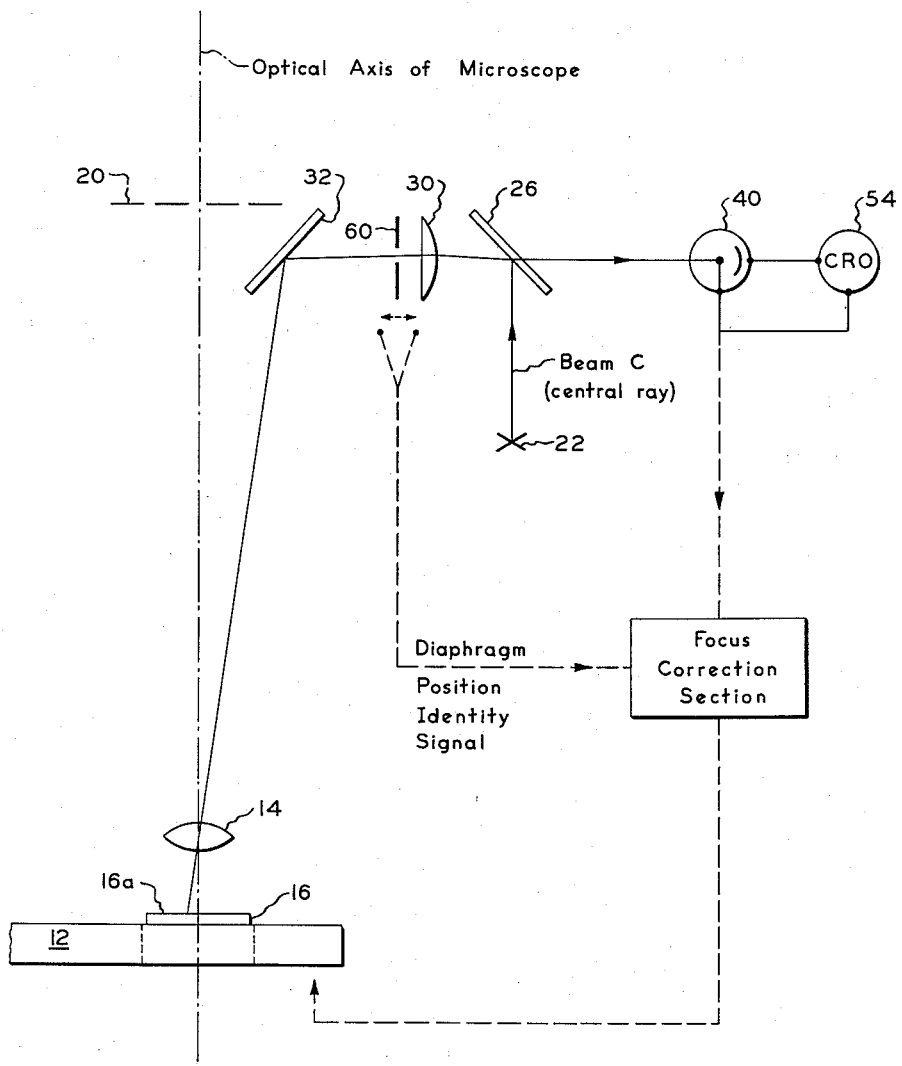
Fig. 4 is a diagrammatic view of a modified optical system of the invention.

In Fig. 4, the focus appraisal section of an automatic focusing system is illustrated which employs a single beam C, both the incident and reflected components of a central ray of this beam following approximately the same path and thus being shown as one from beam splitter 26 and reflecting surface 16a. With the exception of deleted chopper 24 and diaphragm 28 and added oscillating or reciprocating diaphragm 60, the appraisal section is generally similar to that of Fig. 3, lens 30 now being positioned to the right of the diaphragm merely to indicate an alternate possible position. It is to be assumed that a focus correction section similar to that of Fig. 3 is included, although not sown. Diaphragm 60 is moved back and forth longitudinally of the beam component by a given amount and at a given frequency by oscillatory or vibratory means, not shown, as, for example, by an electromagnetic vibrator having contacts which establish a reference phase for a synchronous rectifier, not shown, of the focus correction section. The two extreme positions of the diaphragm during its movement back and forth represent plus and minus error positions of focus and when a preponderance of light passes through the oscillating diaphragm aperture at either extreme position, a pulse train representing a given "focus error" is produced and thence is transmitted to the photocathode of phototube 40. Elements of the focus correction section then operate substantially in the manner already described relative to Fig. 3. When equal amounts of light pass through the diaphragm aperture at the two extreme positions theerof, focus is correct, the focus correction system is electrically balanced and no correctional movement of the drive motor occurs. The chopper of Fig. 3 can be eliminated because the oscillating diaphragm 60, which is capable of transmitting a single beam C at two spaced positions, serves generally to accomplish the results accomplished by two beams, two fixed, spaced diaphragms and a chopper.

Other methods of coupling the drive motor to the microscope could be employed. For example, it could be coupled to the fine adjustment head or shaft, or a mechanical connection of the type shown in Figs. 1 and 3 could be made with the microscope arm rather than with stage 12. Assuming a mechanism of the type shown in Fig. 1 to be employed, the characteristics of the U-shaped spring 52 could appropriately be such that when rotation of pulley 46 causes the end of the spring with which bearing surface 50 is in contact to move 1 millimeter, a force of approximately one-half pound is exerted at the end attached to stage 12 which, considering a given resiliency of stage 12, would cause slide 16 and surface 16a to move about 1 micron. A movement of the driven end of the spring approximately 10 millimeters would cause slide surface 16a to move about 10 microns. Spring 52 provides a convenient and effective means for accomplishing a substantial mechanical minification of 10 mm./10μ or 1000 times, without the necessity of using levers, gears or other linkages that might involve backlash.

The systems described herein are capable of correcting focusing errors rapidly. For example, small errors can be corrected in approximately one-half second to an accuracy of about 0.1 micron. An error or several microns can be corrected in 1 to 3 seconds. Once the system has been adjusted, the error seldom exceeds 0.2 micron.

In first adjusting the focus of a microscope incorporating an automatic focusing system of the invention, with the automatic focussing system switched off electrically, the operator, without looking into the microscope, initially turns the coarse focus knob manually to establish the approximate focus. As the position of correct focus is reached the balance indicator will register zero, or the pair of pips will appear on the screen of the oscilloscope equal in height as the case may be. If the correct position is passed, the indicator needle will move in a given direction or the pips will disappear and the operator must turn the focus knob in a reverse direction and use the fine focus knob, as may be required, until either the indicator needle is again at zero or the pips reappear and are brought to approximately equal height, either condition indicating correct focus. The automatic focusing system is then switched on and correct focus is maintained automatically. The procedure of first establishing correct focus of the objective permits the condenser and substage mirror to be adjusted as a secondary step, more easily and accurately.

Once the automatic focusing system is in operation, it corrects, automatically, focus errors due to a wide range of causes. Such errors may, for example, involve a slight change of position or focal length of a lens as it becomes warm. Or, a change may occur in the index of immersion oil during warming. Practically any temperature effect relating to the position or optical characteristics of an element such as the objective, objective mounting means, immersion fluid, cover glass, slide or stage is automatically compensated for. If the slide is propelled laterally, continuously or stepwise, as in a routine searching or scanning operation, so that focus tends to be impaired due to such factors as varying thickness of the slide, play in the slide support and translation system, or obliquity of the slide mounting, the focus is automatically corrected.

By inserting a variety of band-pass filters in the focusing beams, slightly different focus settings are required for beams of different wavelength. The system can thus be adapted to evaluating any longitudinal chromatic aberration which may be present. Light source 22 is preferably of a type producing light of a wavelength which does not conflict with other illumination means of a microscope. Where a photosensitive film is positioned at the focal plane the wavelength should be one to which the film is not sensitive. It will be understood, for example, that a source of infrared radiation can be used as a light source and that a photoconductive type of radiation detector can be used in place of a phototube.

While the systems of the invention have generally been described relative to preventing or correcting for undesirable conditions relating to focus, it is to be understood that they can also be used to "reveal" and to evaluate optical differences, such, for example, as differences in depth, thickness or microdisplacements generally which may exist in stepped structures. In such instances, the error signals would be employed to indicate the characteristics of the structure under inspection.

The electronic components indicated by block diagram in Figs. 1 and 3 are merely representative of components which could be employed in the focus correction section of the system. Other devices frequently identified with closed control systems or servomechanisms and differing from the type and arrangement of those shown could be employed intermediate of the phototubes and the mechanical linkage with the microscope to generally accomplish the operations described herein. The mechanism for moving the microscope stage or other portion could also be modified, as, for example, a resilient rubber element might be employed instead of spring 52 and a hydraulic compressive means could be used.

While it would be possible to position components of the focus appraisal section such as light source 22, chopper 24, beam splitter 26, lens 30 and a suitable diaphragm substantially in optical alignment with the optical axis of an associated optical system, for example that of a microscope, the method of positioning such elements to one side of the optical axis, as shown in the illustrations, is preferred. Assuming components of the focus appraisal section to be positioned along the optical axis of a microscope, however, areas of the focal plane used for image-forming purposes could lie to the side of the optical paths employed by the focus appraisal section.

While a galvanometer and an oscilloscope have been mentioned as instruments for indicating both incorrect and correct focus, it will be understood that other devices may be employed for the purpose. Among such alternate means are various audio devices which would be operated by signals of the focus correction section and which would produce "out-of-focus" or "in-focus" sounds or tones. It would also be easily possible to record these signal pulses by conventional means for subsequent visual or sound reproduction and inspection. Similar indicating and recording methods and devices could be employed in evaluating microdisplacements of objects, above-mentioned.

Since certain changes may be made in the systems and devices of the invention herein disclosed without departing from the scope of the invention, it is intended that all matter contained in the above description or shown in the accompanying drawings shall be interpreted as illustrative and not in a limiting sense.

What is claimed is:

1. An automatic focusing system adapted to be incorporated with an optical system which includes both an objective lens and mounting means for an object, said automatic focusing system comprising means providing a reflecting surface of given reflectivity adjacent said object-mounting means, light source means for introducing at least a beam of light to said optical system in a given direction, means comprising a pair of relatively angularly disposed reflecting means and a converging lens positioned therebetween for directing said beam of light from said light source means through said objective lens so as to be incident upon said reflecting surface, diaphragm means having at least an aperture interposed in the path of components of said light beam which are incident upon and reflected from said reflecting surface, radiation detecting means sensitive to said light beam positioned in the path of a reflected component of said light beam which has passed through the aperture of said diaphragm means, and means responsive to said radiation detecting means for varying the optical path length between said objective lens and said reflecting surface means.

2. An automatic focusing system as defined in claim 1, wherein said light source means comprises a band-pass filter for limiting the wavelength band of said beam of light.

3. An automatic focusing system as defined in claim 1, wherein said light source means provides a pair of functional beams which are introduced to said optical system and wherein said diaphragm means comprises a pair of diaphragms, each diaphragm being located in the path of one of said beams.

4. An automatic focusing system adapted to be incorporated with an optical system which includes both an objective lens and mounting means for an object, said automatic focusing system comprising means providing a specularly reflecting surface of given reflectivity adjacent said object-mounting means, light source means predeterminedly positioned to one side of the optical axis of said optical system for providing a beam of light in a given direction, means comprising a pair of relatively angularly disposed reflecting means and a converging lens positioned therebetween for directing a beam of light from said light source means through said objective lens so as to be incident upon said reflecting surface, diaphragm means having at least an aperture interposed in the path of components of said light beam which are both transmitted in a direction toward and reflected from said reflecting surface, phototube means having a photocathode positioned in the path of a reflected component of said light beam which has passed through the aperture of said diaphragm means, and means responsive to the output of said phototube means for varying the optical path length between said objective lens and said reflecting surface means.

5. A focusing device adapted to be incorporated with an optical system which includes both an objective and mounting means for an object, said focusing device comprising means providing a specularly reflecting surface of given reflectivity adjacent said object-mounting means and lying in a plane disposed substantially at 90° to the optical axis of said objective, light source means for providing a beam of light in a given direction predeterminedly positioned to one side of a used image area of a focal plane of said optical system wherein said object is to be imaged, reflection and conveying lens means for directing a beam of light from said light source means through said objective so as to be incident upon said reflecting surface, diaphragm means having at least an aperture interposed in the path of said light beam at a given distance from said objective and adapted to allow components of said light beam which are incident upon and reflected from said reflecting surface to pass at least twice therethrough, phototube means having a photocathode positioned in the path of a reflected component of said light beam which has passed through the aperture of said diaphragm means, and electrical balance indicator means responsive to the output of said phototube means for indicating both the conjugacy and the absence of conjugacy of said reflecting surface and said focal plane.

6. An automatic focusing system adapted to be incorporated with an optical system which includes both an objective and mounting means for an object, said automatic focusing system being adapted to establish and maintain conjugacy of a median plane of said object and a focal plane for positioning an image of said object and comprising means providing a specularly reflecting surface of given reflectivity adjacent said object-mounting means and lying in a plane disposed substantially at 90° to the optical axis of said objective, light source means for introducing a beam of light in a given direction to said optical system, reflection and converging of lens means for directing said beam of light through said objective so as to be incident upon said reflecting surface, diaphragm means having at least an aperture interposed in the path of said light beam at a distance from said objective which, in terms of optical path length, is at a distance from said median plane of said object similar to that of said focal plane therefrom and which is adapted to allow components of said light beam which are both transmitted in a direction towards and reflected in a substantially opposite direction from said reflecting surface to pass therethrough, phototube means having a photocathode positioned in the path of a reflected component of said light beam which has passed through the aperture of said diaphragm means, and servo means responsive to the output of said phototube means for varying the optical path length between said objective and said reflecting surface means.

7. An automatic focusing system adapted to be incorporated with an optical system which includes both an objective and mounting means for an object, said automatic focusing system comprising means providing a specularly reflecting surface of given reflectivity adjacent said object-mounting means and disposed substantially at 90° to the optical axis of said objective, light source means predeterminedly positioned to one side of the optical axis of said optical system for providing a beam of light in a given direction, reflection and coonverging lens means for directing a beam of light of given form from said light source means through said objective so as to be incident upon said reflecting surface, diaphragm means having at least an aperture interposed in the path of said light beam at a given distance from said objective and adapted to allow components of said light beam which are both transmitted in a direction toward and reflected from said reflecting surface to pass therethrough, phototube means having a photocathode positioned in the path of a reflected component of said light beam, electronic means responsive to the output of said phototube means for actuating electromechanical drive means, and means coupling a movable element of said drive means with a movable support which carries one of said objective and said reflecting surface so that the spacing between said objective and said reflecting surface can be varied, variation of said spacing being provided by a variation of the intensity of the reflected beam component which passes through said diaphragm aperture and which is incident upon said photocathode.

8. An automatic focusing system adapted to be incorporated with an optical system which includes an objective lens, mounting means for an object and a light-shielded chamber in which a focal plane can be established, said automatic focusing system comprising means providing a substantially regular reflecting surface of given reflectivity adjacent said object-mounting means and disposed substantially at 90° to the optical axis of said objective lens, light source means predeterminedly positioned to one side of a used image area of said focal plane for providing a beam of light in a given direction, reflection and converging lens means for so directing a beam of light from said light source means that components of said beam pass through said objective lens and are incident upon said reflecting surface, a pair of diaphragms interposed in the optical paths of said light beam components and adapted to allow light components of said light beam to pass therethrough, phototube means having photocathode portions positioned in the path of components of said light beam returning from said reflecting surface, electronic amplifying and rectifying means responsive to the output of said phototube means, electromechanical drive means actuated by said electronic means, and adjustable coupling means connecting said drive means with an adjustable support for one of said objective lens and said reflecting surface so that the optical path length between said objective lens and said reflecting surface can be varied, variation of said optical path length depending upon the intensity of reflected light beam components which pass through said aperture of said diaphragm means and which are incident upon said photocathode portions and no variation of said path length occurring when conjugacy of said reflecting surface and said focal plane is established.

9. An automatic focusing system adapted to be incorporated with an optical system which includes an objective and mounting means for an object, said automatic focusing system comprising means providing a substantially specularly reflecting surface adjacent said object-mounting means and disposed substantially at 90° relative to the optical axis of said objective, light source means predeterminedly positioned to one side of the optical axis of said optical system for providing a beam of light in a given direction, beam splitter means for directing a component of said beam toward said optical axis, diaphragm means interposed in the path of said beam component, positive lens means for imaging said light source on said objective, plane mirror means for directing said beam component toward said objective and said reflecting surface whence a reflected component returns to said plane mirror, positive lens, diaphragm and beam splitter means, respectively, phototube means positioned in the path of a portion of said returning beam component which is transmitted by said beam splitter, and means responsive to the output of said phototube means for varying the optical path length between said objective and said reflecting surface means.

10. An automatic focusing system as defined in claim 9, wherein said means responsive to the output of said phototube means comprises electronic means for rectifying and amplifying the output of said phototube means, a drive motor actuated by the output of said electronic means, and means coupling said drive motor and a support carrying one of said objectives and said reflecting surface whereby the optical path length between said objective and reflecting surface is varied, said positive lens also serving to image said objective at said phototube means.

11. An automatic focusing system as defined in claim 9, wherein there is included, in the path of said beam of light, light-chopper means comprising a rotatable disk having an array of light-transmitting apertures which are intermittently positioned in said path, whereby a component of said beam is transmitted as a train of light pulses.

12. An automatic focusing system adapted to be incorporated with an optical system which includes both an objective and mounting means for an object which is to be imaged by said optical system, said automatic focusing system comprising means providing a specularly reflecting surface adjacent said object-mounting means and disposed substantially at 90° relative to the optical axis of said objective, light source means predeterminedly positioned to one side of a used image area of a focal plane of said optical system for producing a pair of light beams, light chopper means comprising a rotatable disk having an array of light transmitting areas which are positioned at a given frequency in the paths of said pair of light beams, means for directing components of said light beams in the form of trains of light pulses from said light chopper means through said objective so as to be incident upon said reflecting surface, a pair of diaphragms interposed in the paths of said light beam components at given distances from said objective, said diaphragms being adapted to selectively permit said light beam components to pass therethrough in directions toward and away from said objective, radiation detecting means positioned in the paths of reflected beam components which have passed through said diaphragms, and means responsive to said radiation detecting means for varying the optical path length between said objective and said reflecting surface means.

13. An automatic focusing system as defined in claim 12, wherein one of said pair of diaphragms is effectively closer in terms of optical path length to said reflecting surface than is said focal plane to said surface, and wherein the other of said diaphragms is effectively more remote from said reflecting surface than is said focal plane, said pair of diaphragms thus effectively bracketing said focal plane of the optical system.

14. An automatic focusing system as defined in claim 13, wherein said radiation detecting means comprises phototube means and wherein said means responsive to the output thereof comprises electronic amplifying and rectifying means, driving means actuated by said electronic means, and means coupling said driving means with a movable support carrying one of said objective and reflecting surface whereby the optical path length between said objective and said reflecting surface is varied, variation depending upon the relative intensity of reflected light beam components of said pair of light beams which pass through said diaphragms and are incident upon said phototube means, no variation occurring when said components are of equal intensity, which condition indicates conjugacy of said reflecting surface and said focal plane.

15. A device for automatically providing correct focus of lens means of said device with respect to an object mounted adjacent an optical axis of said device, said device comprising, in optical alignment, an objective, mounting means for an object to be imaged, a light-shielded chamber in which a focal plane is established for an image of said object, and means providing a specularly reflecting surface of given reflectivity adjacent said object-mounting means and disposed substantially at 90° relative to said optical axis, light source means predeterminedly positioned to one side of said optical axis for providing a relatively narrow beam of light, means for directing said light beam through said objective so as to be incident upon said reflecting surface, diaphragm means interposed in the path of said light beam adapted to control the transmission of components of said light beam to and from said reflecting surface, radiation detecting means sensitive to said light beam positioned in the path of a reflected component of said light beam which has passed through the aperture of said diaphragm means, and means responsive to said radiation detecting means for varying the optical path length between said objective and said reflecting surface means as may be necessary to maintain said correct focus.

16. An automatic focusing system adapted to be incorporated with an optical system which includes both an objective and mounting means for an object which is to be imaged by said optical system, said automatic focusing system comprising means providing a specularly reflecting surface of given reflectivity adjacent said object-mounting means and disposed substantially at 90° relative to the optical axis of said optical system, light source means predeterminedly positioned to one side of an image area of a focal plane of said optical system for producing a pair of light beams, light chopper means comprising a rotatable disk having an array of light-transmitting areas which are positioned at a given frequency in the paths of said pair of light beams, means for directing components of said light beams in the form of trains of light pulses from said light chopper means through said objective so as to be incident upon said reflecting surface, a pair of diaphragms interposed in the paths of said light beam components at given distances from said objective, said diaphragms being adapted to allow said light beam components to pass twice therethrough toward and away from said reflecting surface, reflecting means for diverting the components of one of said light beams which are returning from said reflecting surface and which have passed through one of said diaphragms, said reflecting means diverting said beam components in a direction away from those returning beam components which have passed through the other diaphragm so as to produce separated beam components, a pair of phototubes individually positioned in the paths of said separated beam components, and means responsive to the electrical output of said phototubes for varying the optical path length between said objective and said reflecting surface means.

17. An automatic focusing system adapted to be incorporated with an optical system which includes both an objective and mounting means for an object which is to be imaged by said optical system, said automatic focusing means comprising means providing a specularly reflecting surface of given reflectivity adjacent said object-mounting means and disposed substantially at 90° relative to the optical axis of said optical system, light source means predeterminedly positioned to one side of an image area of a focal plane of said optical system for producing a pair of light beams, light chopper means comprising a rotatable disk having an array of light-transmitting areas which are positioned at a given frequency in the paths of said pair of light beams, means for directing components of said light beams in the form of trains of light pulses from said light chopper means through said objective so as to be incident upon said reflecting surface, a pair of diaphragms interposed in the paths of said light beam components at given distances from said objective, said diaphragms being adapted to allow said light beam components to pass twice therethrough toward and away from said reflecting surface, reflecting means for diverting the components of one of said light beams which are returning from said reflecting surface and which have passed through one of said diaphragms, said reflecting means diverting said beam components in a direction away from those returning beam components which have passed through the other diaphragm so as to produce separated beam components, a pair of phototubes individually positioned in the paths of said separated beam components, electronic amplifying and rectifying means responsive to the output of said phototubes, electromechanical drive means actuated by said electronic means, and means coupling said drive means with a movable support for one of said objective and said reflecting surface so that the optical path length between said objective and said reflecting surface can be varied.

18. In combination with a microscope, an automatic focusing system for establishing and maintaining a correct optical path length between a median plane of an object positioned for imaging purposes in said microscope and objective means of said microscope, said automatic focusing system comprising light source means predeterminedly positioned to one side of a used image area of a focal plane of said microscope, chopper means for converting rays of light from said light source means to a pulsating form, means comprising a positive lens and a planar reflecting element for directing said light rays through said objective so as to be incident on a specularly reflecting surface adjacent to said object, said reflecting surface being disposed substantially at 90° relative to the optical axis of said microscope, diaphragm means having at least an aperture interposed in the path of said light rays adjacent said positive lens and adapted to allow components of said rays which are directed toward and from said reflecting surface to pass therethrough, phototube means positioned in the path of said rays directed from said reflecting surface and passing through said diaphragm means, and means responsive to the output of said phototube means for varying the optical path length between said objective and said reflecting surface means.

19. An automatic focusing system adapted to be incorporated with an optical system which includes an objective and means for mounting an object, said automatic focusing system comprising means providing a specularly reflecting surface of given reflectivity adjacent said object-mounting means and disposed substantially at 90° to the optical axis of said optical system, light source means predeterminedly positioned to one side of a used image area of a focal plane of said optical system, means for directing a beam of light along an optical path extending from said light source means through said objective so as to be incident upon said reflecting means, diaphragm means positioned in said optical path between said light source means and said objective, said diaphragm means being adapted to be moved back and forth a relatively short distance at a rapid frequency longitudinally of said optical path so that components of said light beam which are directed toward said reflecting surface and components which are reflected from said reflecting surface are adapted to pass through said diaphragm means, phototube means positioned in the path of a reflected component of said light beam, and means responsive to the output of said phototube means for varying the optical path length between said objective and said reflecting surface means.

20. An automatic focusing system as defined in claim 19, wherein electromagnetic vibrator means are provided for causing oscillatory movement of said diaphragm means, wherein electrical contact means are provided in association with said vibrator means for producing current pulses which establish an electrical reference phase with respect to the various positions of said diaphragm, and wherein said means responsive to the output of said phototube means comprises a synchronous rectifier which derives a reference phase from said current pulses.

21. The method of establishing and maintaining conjugacy of a focal plane and a reflecting surface in an optical system including an objective which is characterized by directing a beam of light along an optical path leading toward said optical system, interrupting said light beam prior to its introduction to said optical system at a given frequency to provide said beam in the form of a train of light pulses, directing said light beam along an optical path leading toward said objective and said reflecting surface so that components thereof pass through said objective to said reflecting surface and reflected components return through said objective and converge with the components directed toward said reflecting surface, intercepting a given portion of the beam components at a location of their convergence while transmitting other separately identifiable portions, electronically converting the separately identifiable portions into separately identifiable electric currents, comparing the electric currents, and varying the optical path length between said objective and said reflecting surface in accordance with any lack of balance which may exist between said electric currents.

References Cited in the file of this patent

UNITED STATES PATENTS

| | | |
|---|---|---|
| 1,866,581 | Simjian | July 12, 1932 |
| 2,164,576 | Collins | July 4, 1939 |
| 2,254,548 | Ruhle et al. | Sept. 2, 1941 |
| 2,339,780 | Huitt | Jan. 25, 1944 |
| 2,524,807 | Kallmann | Oct. 10, 1950 |

FOREIGN PATENTS

| | | |
|---|---|---|
| 719,700 | Great Britain | Dec. 8, 1954 |

UNITED STATES PATENT OFFICE
CERTIFICATE OF CORRECTION

Patent No. 2,968,994

January 24, 1961

William A. Shurcliff

It is hereby certified that error appears in the above numbered patent requiring correction and that the said Letters Patent should read as corrected below.

Column 7, line 13, for "sown" read -- shown --; line 29, for "theerof" read -- thereof --; column 10, line 8, for "conveying" read -- converging --; line 63, for "coonverging " read -- converging --.

Signed and signed this 5th day of March 1963.

(SEAL)
Attest:

ESTON G. JOHNSON
Attesting Officer

DAVID L. LADD
Commissioner of Patents